June 9, 1925.
A. DE BERNARD
FAUCET AND SIMILAR DEVICE
Filed May 5, 1924
1,541,251
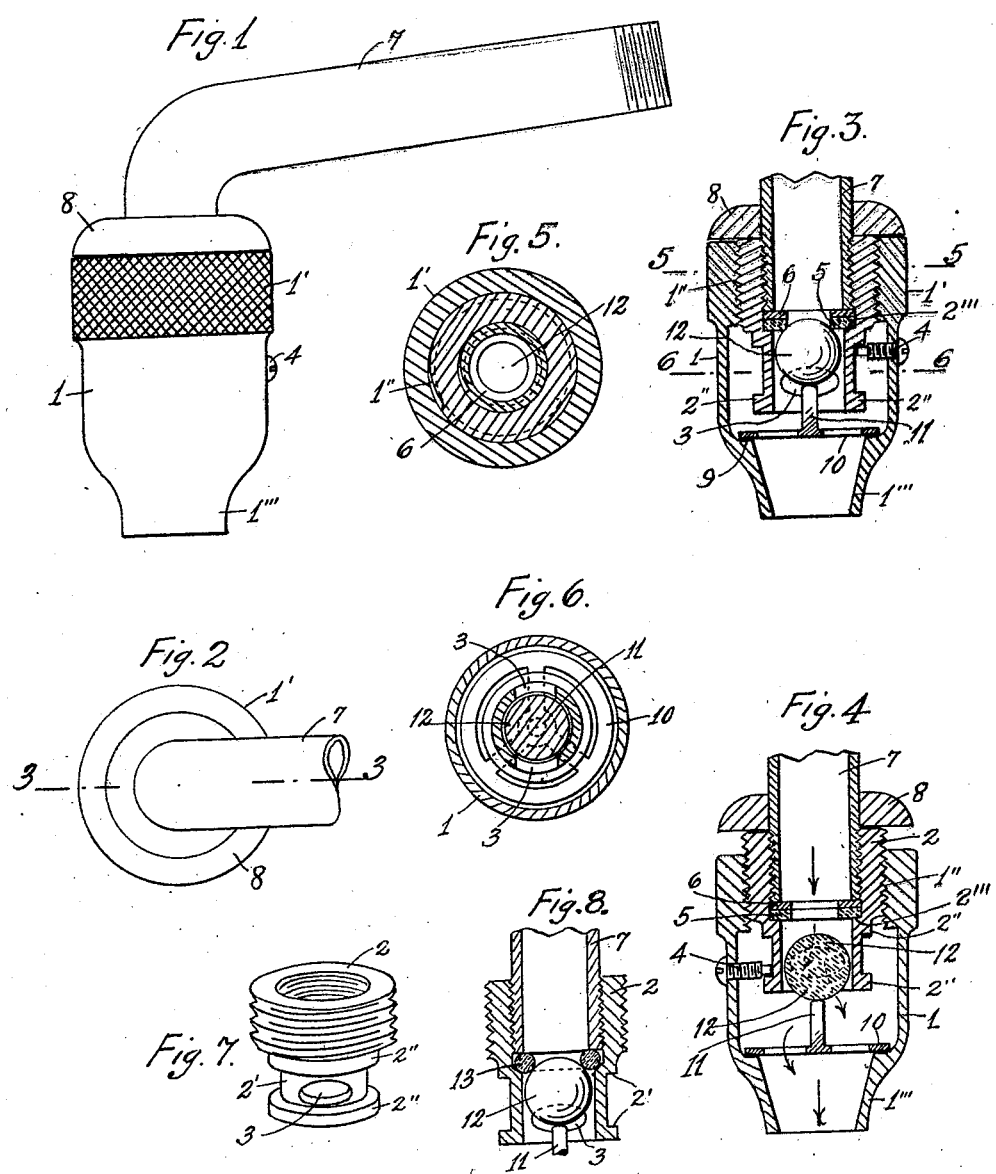
Inventor
A. de Bernard
by Langner, Parry, Card & Langner
Attys.

Patented June 9, 1925.

1,541,251

UNITED STATES PATENT OFFICE.

ALEJANDRO DE BERNARD, OF HABANA, CUBA.

FAUCET AND SIMILAR DEVICE.

Application filed May 5, 1924. Serial No. 711,217.

*To all whom it may concern:*

Be it known that I, ALEJANDRO DE BERNARD, citizen of Russia, residing at Habana, Cuba, have invented certain new and useful Improvements in Faucets and Similar Devices, of which the following is a specification.

This invention relates to cocks and faucets and the like and has for one of its principal objects to provide a novel arrangement of the parts of the same whereby to simplify the construction and reduce the number of parts, and at the same time to provide a device effectually preventing all leakage.

Further advantages will be perceived in the course of the following specification taken in connection with the accompanying drawings wherein like reference characters designate like parts and wherein;

Fig. 1 is a side elevation of the device.

Fig. 2 is a top plan view of the same.

Figs. 3 and 4 are partial vertical longitudinal sections on the line 3—3 of Fig. 2 showing the parts in different operative positions.

Fig. 5 is a horizontal section on line 5—5 of Fig. 3.

Fig. 6 is a horizontal section on line 6—6 of Fig. 3.

Fig. 7 is a perspective view of one of the faucet elements.

Fig. 8 is a vertical section of a portion of the device showing a slightly modified form thereof.

As shown in the drawings the device includes a hollow casing 1 open at both of its ends with its upper outer portion roughened to provide a finger grip 1′ and the corresponding inner portion screw threaded as at 1″. The lower end of the casing is in the form of a reduced outlet 1‴.

As most clearly shown in Figure 7 a valve box 2 threaded both interiorly and exteriorly at its upper end is screw threaded into the casing 1. The lower end of valve box 2 presents a smooth portion 2′ limited by upper and lower stop flanges 2″, with diametrically opposed outlets 3 in the smooth portion.

A screw 4 is threaded through the side of the casing 1 and bears with its inner end against portion 2′ of valve box 2 whereby to limit relative motion between the box and the casing by contacting with the flanges 2″.

Adjacent the inner threaded portion of member 2 is an annular seat 2‴ which receives a washer valve seat 5 made of suitable resilient material. On the washer 5 is positioned a metallic washer 6 against which bears the end of an inlet pipe 7 which is screw threaded into the valve box 2 as clearly shown in Figures 3 and 4. A stop cap 8 is carried by the inlet pipe 7 for finishing off the completed device.

Adjacent the outlet 1‴ is an annular seat 9 which carries a perforated plate 10 having a central upstanding stem or arm 11. In the valve box and between the stem 11 and the washer 5 is positioned a ball valve 12 formed of any suitable resilient material. The valve 12 is in constant engagement with the stem 11 due to gravity.

In Figure 8 is shown a slight modification of the above described structure wherein a resilient ring 13 is used to replace resilient washer 5 and metallic washer 6.

To operate the above described device it is merely necessary to rotate the casing 1 on the valve box 2 by means of the interengaging screw threads, the relative motion between these two parts being limited by screw 4 as explained above. Depending upon the direction of rotation imparted to the casing 1 the valve 12 is either forced into its closing position as shown in Figure 3 or is permitted to take its opening position as shown in Figure 4.

Having now described one form of my invention I now claim:—

1. A valve device, comprising, a casing, a valve box within and screw threaded to the casing, an inlet pipe screwed into the box, a valve seat at the end of the pipe, a loose valve in the box and positioned in front of the seat, and mechanical means controlling movement of the valve to closing and opening positions.

2. A valve device, comprising, a casing, a valve box within and screw threaded to the casing, an inlet pipe screwed into the box, a valve seat at the end of the pipe, a loose valve in the box and positioned in front of the seat, and mechanical means controlling movement of the valve to closing and opening positions, said mechanical means being actuated by screwing the casing relatively to the box, and means to limit movement between the casing and the box.

3. A valve device, comprising, a casing, a valve box within and screw threaded to the casing, an inlet pipe screwed into the box, a valve seat at the end of the pipe, a loose valve in the box and positioned in front of the seat, and mechanical means controlling movement of the valve to closing and opening positions, said mechanical means being actuated by screwing the casing relatively to the box, and means to limit movement between the casing and the box, said mechanical means including, an apertured plate carried by the casing, and a pusher arm on the plate and in constant contact with the valve.

4. A valve device, comprising, a casing, a valve box within and screwed to the casing, the valve box having a projecting, smooth, bored extension limited by flanges, a supply pipe connected to the box, a valve seat at the end of the pipe, a spherical valve loosely positioned in the box, an apertured plate carried by the casing, a pusher arm on the plate in permanent engagement with the valve, screwing of the casing on the box moving the pusher arm to control opening and closing of the valve seat, and a screw in the casing projecting within the same against said smooth extension on the box to limit movement of the casing relative to the box by contact of the screw with said flanges.

In testimony whereof I have signed my name to this specification.

ALEJANDRO DE BERNARD.